E. C. GROVER.
INSECT DESTROYER.
APPLICATION FILED FEB. 21, 1917.
1,249,071.
Patented Dec. 4, 1917.
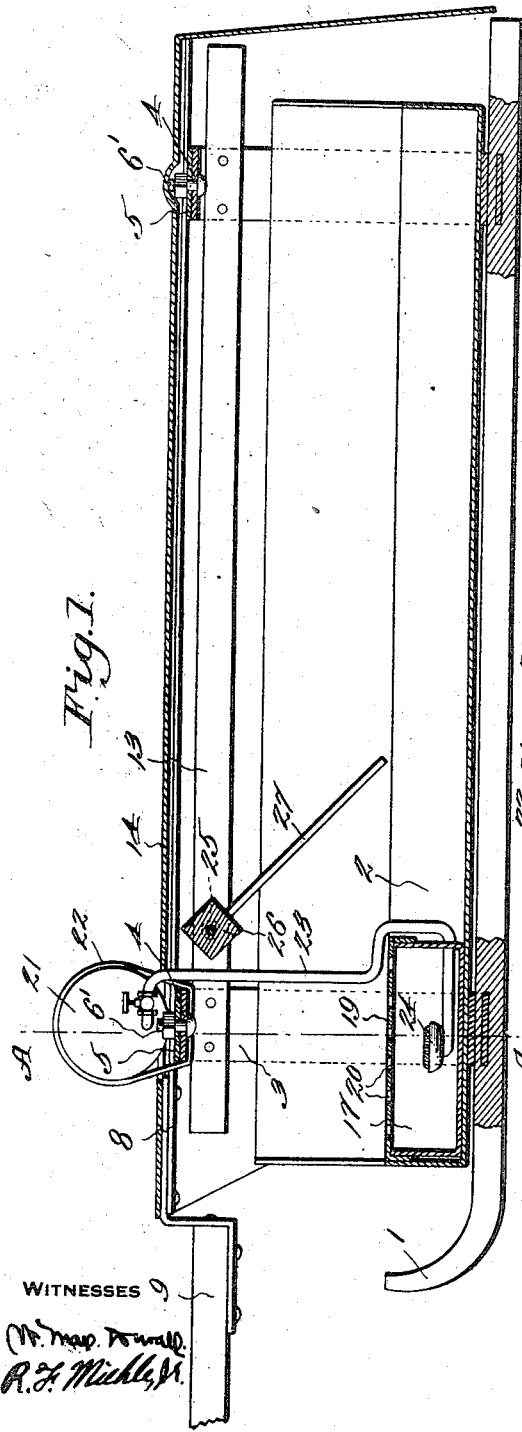
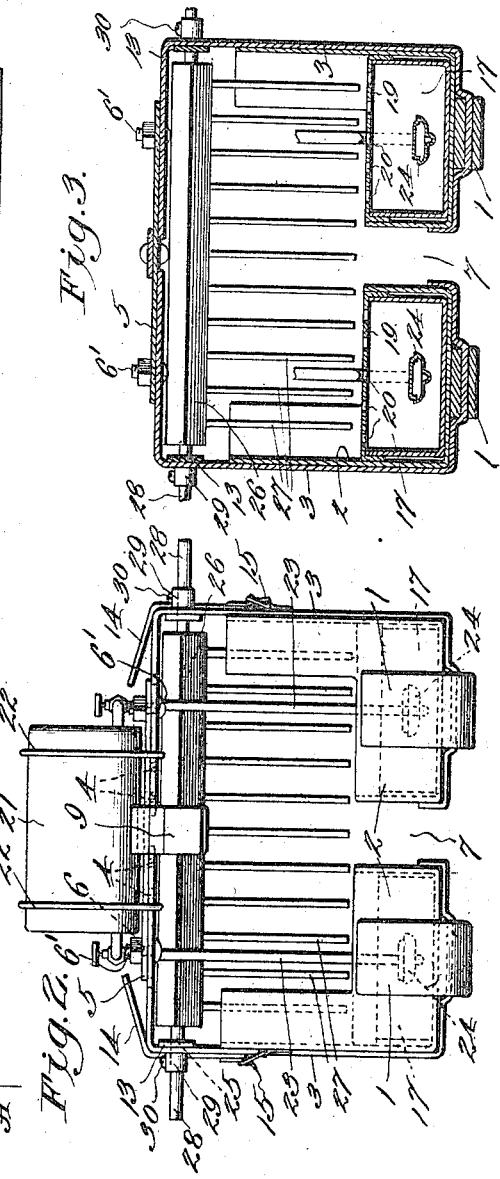
INVENTOR
E. C. Grover,
BY Victor J. Evans
ATTORNEY
WITNESSES

UNITED STATES PATENT OFFICE.

EMMANUEL C. GROVER, OF MATHIS, TEXAS.

INSECT-DESTROYER.

1,249,071.   Specification of Letters Patent.   Patented Dec. 4, 1917.

Application filed February 21, 1917. Serial No. 150,192.

*To all whom it may concern:*

Be it known that I, EMMANUEL C. GROVER, a citizen of the United States, residing at Mathis, in the county of San Patricio and State of Texas, have invented new and useful Improvements in Insect-Destroyers, of which the following is a specification.

My invention relates to that type of insect destroyers which are adapted to remove insects from growing plants and kill them, and has for its objects; first, to provide an efficient insect destroyer; and second, to provide an insect destroyer of a portable construction adapted to be moved over a row of growing plants and remove and destroy insects thereon without injuring the plants; and thirdly, to provide an insect destroyer of an adjustable nature which may be used on plants of varying sizes and shapes.

With these and other objects in view my invention consists of certain novel constructions and arrangement of parts, as will be hereinafter fully described and claimed.

I attain these objects by the mechanism illustrated in the accompanying drawings, in which:—

Figure 1 is a vertical sectional view in side elevation of an insect destroyer embodying my invention, Fig. 2 is a front elevation of the same, Fig. 3 is a transverse section of the device on line A—A of Fig. 1 with the fuel tank and the flexible cover thereof removed.

Like characters of reference indicate like parts in the various views.

In the drawings 1 designates spaced runners upon which the device is moved over the ground. Longitudinally disposed upon said runners are trough members 2 which are liquid tight and have their inner side and end walls comparatively low while their outer side walls extend upwardly some distance. Lateral braces 3 are disposed upon troughs 2 and extend upwardly from the outer side walls of said trough, their upper ends being bent to a horizontal position and extending inwardly over their respective troughs. Each brace of one trough member has an opposing brace on the other trough member, the horizontal portions of each pair of braces lying in the same plane. A series of holes 4 are provided on each of the horizontal portions of said braces 3. A strut bar 5 is provided for each pair of opposing braces 3 and has holes 6 at its ends corresponding with holes 4 in the horizontal portions of respective braces 3. Bolts 6' are provided which engage said holes and clamp the strut bars and the corresponding pairs of braces together. The troughs 2 are disposed parallel to each other and some distance apart so that a longitudinal slot 7 extends betwen them, and the width of this slot may be varied for purposes hereinafter set forth by removing bolts 6' from holes 4 and 6 and moving the trough portions the desired distance apart and again clamping the strut bars and the braces by the bolts 6' engaging holes 6 and the holes of series 4 which are in registry therewith. A longitudinally disposed draft bar 8 is disposed at the center of the device and is affixed to strut bars 5. The front end of draft bar 8 turns down and a tongue 9 of usual construction thereto and extends forward whereby the device may be pulled along the ground upon runners 1. Longitudinal strips 13 are secured on the vertical portions of the braces 3 of each trough and near the top thereof. A cover 14 of canvas or other suitable material is provided and extends over and is supported upon said strips 13, lateral braces 3 and draft bar 8. Said canvas cover 14 extends the entire length of the device and some distance to the rear thereof. This rear portion of cover 14 is unsupported and being of flexible material drags and thereby partially closes up the rear end of the inclosure. The sides of said cover 14 extend down over strips 13 and are fastened to the outer walls of said troughs by adjustable straps 15 affixed to edges of cover 14 at convenient intervals and buckles 16 disposed on said outer walls in position to engage corresponding straps 15. Said straps and buckles are of usual construction and need no further description for the present purposes. The front and rear ends of outer walls of troughs 2 are turned inwardly to partially close the ends of the inclosure. The trough members 2 together with their connecting means form an inclosure open at the top and ends. The canvas cover 14 closes the top and upper sides thereof and partially closes the rear end.

At the front end of troughs 2 sulfur boxes 17 are disposed having removable tops 19 for filling the same and a number of holes 20 in said top to allow fumes to escape therefrom. A tank 21 is disposed upon the top of the front braces 3 of troughs 2 and strut bar 5 and is secured there by clamps 22. A pipe 23 leads from each of said tanks to each corresponding sulfur box 17. A burner 24 of usual construction is provided at the ends of each pipe and is disposed in its corresponding sulfur box 17. In the operation of the device the burners 24 which are fed with oil from said tank 21 through pipes 23 are lighted and burn in said sulfur boxes. Sulfur is placed in said boxes and is burned by the flame of the burners, and gives forth fumes which issue through holes 20. These sulfur boxes are of usual construction and need no further description for the present purposes. The cover 14 is provided with openings to allow clamps 22 to engage braces 4 and to allow pipes 23 to pass downwardly into the sulfur boxes.

Laterally disposed in bearings 25 in the strips 13 near the front end thereof is a drag rake comprising a cross member 26 and downwardly projecting prongs 27. Cross member 26 is of such a length that when the troughs 2 are adjusted in their contracted position said cross member 26 will just extend across between the strips 13, and will be free to swing therein. Studs 28 are formed at each end of said cross member 26 and are disposed in the same longitudinal axis. Said studs engage respective bearings 25 and extend through the same and are of such a length that a portion of said studs 28 extend beyond bearings 25 when the troughs are in their extended position. Collars 29 having said screws 30 screw threaded in them engage the outward extending ends of studs 28 whereby the cross member 26 is prevented from lateral movement by the inner surfaces of collars 29 bearing against the outer surfaces of bearings 25. Said collars 29 may be moved along stud 28 and secured thereto at any desired point by said screws 30 whereby they may perform their functions when troughs 2 are in their various positions. The weight of prongs 27 is such that they normally extend downwardly.

In the operation of the device the size of the plants to be treated is determined and the troughs adjusted by the means hereinbefore described so that slot 7 is of such a width as to just allow the stems of the plants to pass through. The cover 14 is then adjusted by means of straps 15 and buckles 17 to be stretched fairly tight. The troughs 2 are filled with insect destroying liquid. The sulfur boxes 17 are partially filled with sulfur and tanks 21 filled with an inflammable oil. The burners 24 are then lighted, and the sulfur is burned thereby, and destructive flames arise through holes 20 of said sulfur boxes and fill the inclosure. The device is drawn along on runners 1, the plants passing through slot 7. As plants pass through said slot 7 the prongs 27 of the drag rake passes over the plants and agitates them and removes insects loosely attached to the plants. The insects drop from the plants and most of them fall into the liquid in troughs 2 where they are destroyed. It will be noted, that slot 7 may be made as narrow as possible by reason of the detachable connection between troughs 2, and a very small portion of the insects, which are shaken from the plants, fall into said slot. The insects that do fall into said slot are subject to the fumes and have little chance of surviving. The insects which are not shaken off are subject to the fumes of the sulfur boxes, said fumes being confined by the above described inclosure comprising troughs 2 and cover 14. The rear end of cover 14 drags on the plants and serves to close the rear end as much as possible. The front end of the inclosure is open there being no necessity for closing it as the draft formed by moving the device prevents the fumes from getting out of said front end.

The prongs 27 of the rake will not injure the plants in agitating them, and if an unusual obstruction is encountered said prongs will swing up and pass over the obstruction by reason of the construction hereinbefore described. It will be noted that the device may be operated to advantage without using the fumigating device. The cover 14 may be removed when the device is used in this manner and the prongs 17 perform their usual functions of agitating the plants and thus shaking insects off from said plants, whereupon they fall into the troughs and are destroyed by the liquid therein as hereinbefore described.

Having thus fully described my invention, I claim:

1. In a device of the character described, an inclosure comprising two trough members having a longitudinal slot extending between them, adjustable means at the top of said inclosure for securing said members together whereby the width of said slot may be varied, an adjustable cover extending over said trough members and secured thereto, a flexible flap attached to the rear end of said cover, sulfur boxes disposed in said trough members, oil tanks disposed on the inclosure structure, pipes leading from said tanks, and burners disposed in said sulfur boxes and communicating with said pipes.

2. In a device of the character described, an inclosure comprising two trough members having a longitudinal slot extending between them, adjustable means at the top of said inclosure for securing said trough members together whereby the width of the slot may be varied, a laterally disposed drag rake mounted for swinging movement and having laterally adjustable bearings, an adjustable cover extending over said trough members and secured thereto, a flexible flap attached to the rear end of said cover, sulfur boxes disposed in said trough members, oil tanks disposed on the inclosure structure, pipes leading from said tanks, and burners disposed in said sulfur boxes and communicating with said pipes.

In testimony whereof I affix my signature.

EMMANUEL C. GROVER.

Copies of this patent may be obtained for five cents each, by addressing the "Commissioner of Patents, Washington, D. C."